United States Patent [19]

Burdorf et al.

[11] 4,049,216
[45] Sept. 20, 1977

[54] METHOD AND APPARATUS FOR GENERATING CONSTANT TAPE TENSION IN A TAPE TRANSPORT APPARATUS

[75] Inventors: Donald L. Burdorf, Newport Beach; James Bjordahl, Arcadia, both of Calif.

[73] Assignee: BASF Aktiengesellschaft, Ludwigshafen (Rhine), Germany

[21] Appl. No.: 574,959

[22] Filed: May 6, 1975

[51] Int. Cl.² .......................... G03B 1/04; G11B 15/32
[52] U.S. Cl. ................................... 242/192; 226/182; 242/206; 242/208
[58] Field of Search ............... 242/192, 206, 208–210; 226/182, 186, 187; 360/71, 73

[56] References Cited
U.S. PATENT DOCUMENTS

| | | | |
|---|---|---|---|
| 3,528,625 | 9/1970 | Bumb, Jr. ............................. | 242/192 |
| 3,593,945 | 7/1971 | Richardson et al. ................. | 242/192 |
| 3,638,880 | 2/1972 | Hollingsworth ..................... | 242/192 |

*Primary Examiner*—Leonard D. Christian
*Attorney, Agent, or Firm*—Keil, Thompson & Shurtleff

[57] ABSTRACT

A method of generating constant tape tension in a tape transport apparatus of the type in which the supply and take-up reels of tape are simultaneously driven by surface engagement with a driving capstan.

The method involves the utilization of a flexible but relatively inelastic belt around the periphery of resilient capstan material to introduce reel size-related supply and take-up reel velocity adjustments to counteract the similar but opposite velocity adjustments which inherently occur through the use of a resilient capstan and which, if uncompensated, result in undesirable tension variations during the course of the tape transporting operation.

2 Claims, 6 Drawing Figures

METHOD AND APPARATUS FOR GENERATING CONSTANT TAPE TENSION IN A TAPE TRANSPORT APPARATUS

BACKGROUND OF THE INVENTION

In general, tape transport systems in which the supply and take-up reels are simultaneously driven by surface engagement with a driving capstan require the presence of tension in the tape span between the supply and take-up reels. The tension permits the formation of a tape pack wound on a flangeless hub which will retain its physical shape without side support and which will also withstand the high speeds and rapid accelerations and decelerations normally associated with this type of unit.

Generally such tape transports require that the tension be maintained at a constant level in order to assure uniform contact between the recording head and tape surface to enable the transduction of a flutter-free signal. An example of such a type transport is disclosed in pending U.S. application Ser. No. 388,929, filed Aug. 16, 1973 now Pat. No. 3,921,933, the disclosure of which is incorporated herein by reference. The constant tape tension in that tape transport is maintained almost entirely by braking the reel serving as the supply reel. The braking causes the surface velocity of the capstan and that of the unbraked take-up reel to slightly exceed the surface velocity of the supply reel. To accommodate the difference in speed between the supply and take-up reels the interconnecting span of tape in forced to stretch, thus generating the desired tape tension.

As an alternative to supply reel braking, other tape transports have relied upon the differential deformation phenomenon. The device in U.S. Pat. No. 3,370,803 is an example of such a tape transport. The tension is generated by using a capstan the peripheral portion of which has a capacity for elastic flow. By applying a greater force at the take-up reel/capstan interface than at the supply reel/capstan interface the rate of local acceleration by elastic flow of the capstan material at the former will exceed that at the latter. The effect is to impart a slightly higher velocity to the take-up reel with the result that tension is generated in the tape between the supply and the take-up reels by introducing, as with supply reel braking, a velocity difference between the take-up and supply reels.

As set forth in pending U.S. application Ser. No. 574,958 filed of even date with this application and entitled "IMPROVED TAPE TRANSPORT APPARATUS," now U.S. Pat. No. 4,018,402 the disclosure of which is incorporated herein by reference, there are distinct advantages in utilizing both supply reel braking and different biasing forces as tension producing means to generate components of the tension.

Regardless of the method utilized for tension generation—supply reel braking, force difference in biasing, or a combination of both—difficulties are encountered in achieving constant tape tension throughout the tape transport operation. The continually changing sizes of the reels, i.e. the large-to-small progression of the supply reel and the small-to-large progression of the take-up reel is a significant source of tension variation.

In a system which utilizes supply reel braking as a tension producing means, the use of a constant torque brake results in an increase in the force required to drive the supply reel at its periphery as the size of the reel decreases during the tape transporting operation. This increase results in a decrease in the driven speed of the supply reel. Since the tension level is a function of the difference in speed between the supply and take-up reels, the tension level will increase during the tape transporting operation. Hereinafter, this reel size-related velocity change will be referred to as the "brake effect." Although several varieties of decreasing torque brakes which maintain the driving force at a constant level are known and have been disclosed, for example, in U.S. Pat. No. 3,482,800 and in copending U.S. applications Ser. Nos. 388,929 now U.S. Pat. No. 3,921,933 and 574,958 now U.S. Pat. No. 4,018,402 filed Aug. 16, 1973, and of even date with this application, respectively, these generally are more complex and, consequently, more expensive than constant torque brakes.

Similarly, in a system which utilizes the differential deformation effect as a tension producing means, serious problems are encountered as the supply and take-up reel sizes change during the tape transporting operation if a constant force differential is maintained at the supply and take-up reel interfaces with the capstan. The deformation at the supply side increases as the supply reel decreases in size and the deformation at the take-up side decreases as the take-up reel increases in size. The result is a decrease in the supply/take-up reel velocity differential with a resulting decrease in the tape tension level as the supply reel is depleted and the take-up is augmented during tape transporting operation. Hereinafter this reelsize-related velocity change will be referred to as the "$\Delta$ bias effect." One means of compensating for variations in the differential deformation by varying the reel/capstan biasing forces is set forth in above-referenced copending U.S. application Ser. No. 574,958 of even date now U.S. Pat. No. 4,018,402. As was the case with the varying torque brakes, however, a varying biasing force system is more complex and, consequently, more expensive than a constant biasing force system.

The present invention provides a method by which constant tension can be generated without the need for a biasing system or a braking system having variable characteristics to compensate for reel size changes.

OBJECTS AND SUMMARY OF THE INVENTION

An object of the present invention is to provide a method of generating constant tape tension by optimizing the capstan periphery to obviate need for reel/capstan biasing units and/or brakes having characteristics which vary as a function of reel size.

A further object of the present invention is to facilitate the generation of constant tension by tape transports utilizing virtually any combination of supply reel braking and differential deformation of a resilient capstan for generating and maintaining tension.

These and other objects of the invention will be apparent from the summary below and from drawings and detailed description which follow.

An example of the type of tape transport with which this invention is concerned is disclosed in U.S. Pat. No. 3,370,803. The supply and take-up reels are rotatably mounted on slidably mounted carriages and are driven by a resiliently surfaced driving capstan. For the purposes of this disclosure some known means of generating a greater biasing force between the reel serving as take-up reel and the capstan than between the reel serving as supply reel and the capstan is assumed as is a means of braking the supply reel rotation to a significantly greater extent than the take-up reel. Neither the biasing nor the braking means need have characteristics which vary as a function of reel size.

The invention rests primarily in the capstan construction. A layer of resilient material around the capstan periphery covered with a flexible but relatively inelastic belt permits the differential radial capstan deformation at the interfaces between the supply and take-up reels and the capstan necessary to generate a supply/take-up reel velocity differential. The presence of the belt, however, introduces a variation in the supply/take-up reel velocity differential as a result of the supply and take-up reel size progressions which, by the proper selection of the relative inelasticity and the thickness of the belt, complements the other variations in the supply/take-up reel velocity differential such that their algebraic sum approaches zero and uniform tape tension is maintained throughout the tape transporting operation even though neither a non-constant reel/capstan biasing system nor a non-constant supply reel braking system is used.

The reel-size-related variation in the supply/take-up reel velocity differential introduced by the belt results from the nearly constant and uniform velocity of all points on the pitch line of the belt, including those at the reel/capstan interfaces where the belt is deformed for a distance to conform to the reel periphery. Since it is the pitch line of the belt, spaced a distance of one-half of the thickness of the belt from reel periphery, which maintains the constant speed, it follows geometrically (see the analysis in the Detailed Description) that as the reels change in radius during the tape transporting operation their peripheral velocities will also undergo minute changes. This phenomenon will be hereinafter referred to as the "belt effect." The significance of these minute velocity changes is that they oppose the velocity changes which occur as a result of the reel radius effects on the differential deformation.

Since the magnitudes of "belt effect" velocity changes are a function of the thickness of the belt and the magnitudes of the Δ bias effect velocity changes are a function of the circumferential elasticity of the belt, the selection of these two belt characteristics so that the opposite velocity changes equal one another will result in the elimination of reel size variation as a source of tension variation in a system which utilizes solely differential deformation as the method of maintaining tape tension.

Similarly, in a system which utilizes a combination of differential deformation and supply reel braking, the thickness and elasticity of the belt can be chosen to allow the brake effect and the "belt effect" (both of which cause tension to increase during the tape transporting operation) to equal the Δ bias effect (which causes a tension decrease) to eliminate the tension variations introduced by reel size progressions.

It should be apparent that tape transport systems which rely solely upon supply reel braking do not lend themselves to the use of a belted capstan to eliminate reel size tension variations since the brake effect and the belt effect are additive.

DRAWINGS

DETAILED DESCRIPTION

Figure 1:
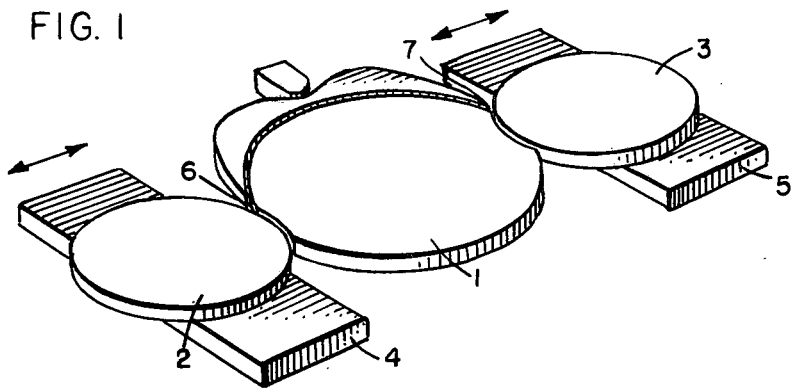
FIG. 1 is a perspective view of the principal elements of a tape transport equipped with the capstan according to the invention.
Figure 2A:
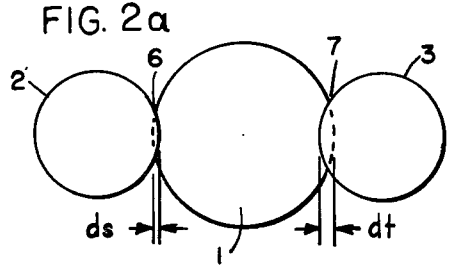
FIG. 2a through 2c illustrates the variation deformation at the supply and take-up reel/capstan interfaces at middle, beginning, and end of the tape transporting operation.
Figure 2B:
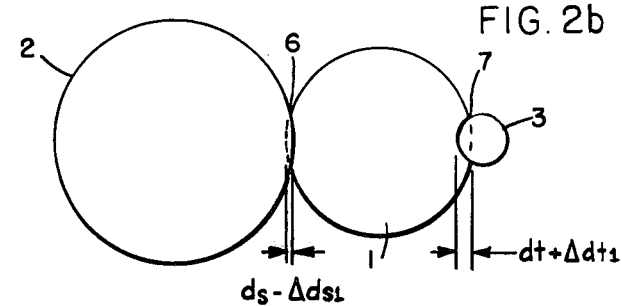
Figure 2C:
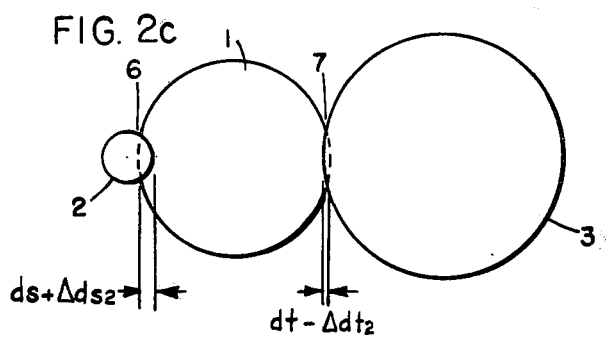

FIG. 1 shows the capstan 1 in conjunction with the principal elements of a tape transport apparatus. Reels 2 and 3 are rotatably mounted on slidable carriages 4 and 5. A biasing system (not shown) urges the carriages toward the capstan 1 with unequal forces such that the bias toward the capstan of the reel serving as take-up reel is greater than the bias toward the capstan of the reel serving as supply reel. U.S. Pat. No. 3,370,803 discloses a typical reversible biasing system which generates the requisite force differential regardless of the direction of tape transport. The result of this differential in bias is a differential in the deformation at the reel-capstan interfaces 6 and 7, as shown in FIG. 2a. In FIG. 2a the supply reel 2 and the take-up reel 3 are equal in size. This relationship occurs only when half the tape is wound on the supply reel and half on the take-up reel. Naturally the supply reel continually decreases in size while the take-up reel continually increases in size during the tape transporting operation. For the purposes of illustration, FIGS. 2b and 2c show how the capstan deformation continually changes as the relative reel sizes change.

With equal size reels as shown in FIG. 2a, the deformation of the capstan at the supply reel/capstan interface 6 is $d_s$ while the deformation of the capstan at the take-up reel/capstan interface 7 is $d_t$ with $d_t$ being greater than $d_s$. As explained above the magnitude of the tape tension generated is a function of the differential deformation, $(d_t - d_s)$. At the beginning of the tape transport operation with the supply reel 2 larger than the take-up reel 3, as shown in FIG. 2b, the corresponding values are $(d_s - \Delta d_{s1})$ and $(d_t + \Delta d_{t1})$, in which case the take-up side deformation is larger than the supply side deformation by $(d_t - d_s + \Delta d_{t1} + \Delta d_{s1})$. On the other hand, with the take-up reel 3 larger than the supply reel 2, as shown in FIG. 2c, the take-up side deformation is larger than the supply side deformation by $(d_s - d_t - \Delta d_{t2} - \Delta d_{s2})$. Since the tape tension is a function of the differential deformation, it follows that tape tension will decrease as a supply reel is depleted and the take-up reel augmented during the tape transporting operation. Without a method of compensation for the reel size variations, therefore, constant tape tension cannot be maintained in a system maintaining a constant force differential between the two reel/capstan interfaces.

As explained above, one method of compensation is through the use of varying biasing forces as disclosed in aforementioned copending U.S. application Ser. No. 574,958, of even date now U.S. Pat. No. 4,018,402. The supply reel/capstan biasing force is continually adjusted downward to maintain a constant deformation, e.g., $d_s$; the take-up reel/capstan biasing is continually adjusted upward to maintain a constant deformation, e.g. $d_t$. The force adjustments compensate for the effect the changing reel sizes would otherwise have had on the velocity of the take-up reel. In this manner the tension variations which would result from the velocity variations are reduced.

Application Ser. 574,958, of even date now U.S. Pat. No. 4,018,402, also utilizes a braked supply reel for reasons set forth at length in the application. The combination braking/biasing systems disclosed in the application have variable braking characteristics. As the supply reel decreases in size, the braking torque similarly decreases to maintain the force required to drive the supply reel at its periphery at a constant level. Accordingly, the change in the velocity differential between the capstan and supply reel which would otherwise result from a constant torque brake is reduced.

To obviate the need for such variable characteristics braking/biasing systems, the present invention uses a resilient capstan the periphery of which is equipped with a belt. As explained below the presence of the belt introduces a geometric phenomenon the effect of which can be to cancel ut the undesirable tension variations.

Figure 3:
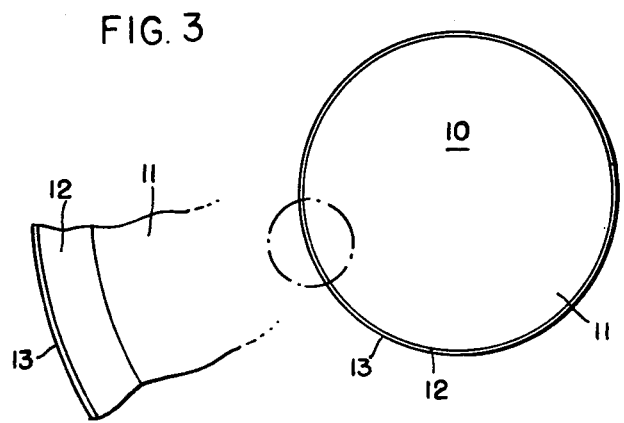
FIG. 3 is a preferred embodiment of the capstan.
Figure 4:
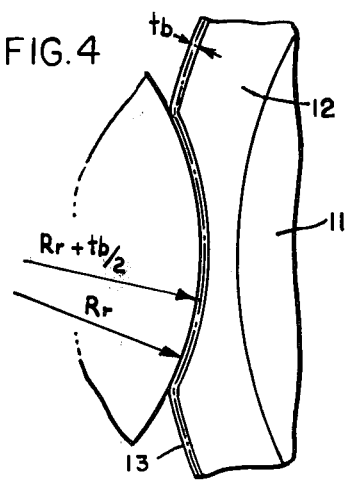
FIG. 4 illustrates how the improved capstan affects the velocity of the reel relative to the capstan as the reel size changes.

Referring to FIG. 3, capstan 10 comprises a substantially non-deformable core 11 to the circumference of which is applied a peripheral portion 12 of resilient material, e.g., rubber, and a belt 13 of inelastic yet flexible material, e.g., mylar. As a result of the flexibility of the belt 13, the radial deformation of the improved capstan would not vary markedly from that of an unbelted capstan as illustrated in FIG. 2. Referring to FIG. 4, however, wherein the pitch line of belt 13 has been shown as a dot-dash line, it can be seen that changes in the velocity of a tape reel with respect to the capstan necessarily occur as the size of the tape reel varies. The velocity of the reel periphery may be expressed in terms of the constant capstan belt pitch line velocity as follows:

$$V_r = V_c(R_r/R_r + t_b/2)$$

where:

$V_r$ is the velocity of the reel periphery;
$V_c$ is the constant pitch line velocity of the capstan belt;
$R_r$ is the radius of the reel; and
$t_b$ is the thickness of the belt.

Given the above expression, the percent change in reel velocity during the tape transporting operation as a result of the belt can be calculated. For example, in a system having an empty reel radius of 1.125 inches, a full reel radius of 2.0 inches and a belt thickness of 0.002 inches, the supply reel velocity will decrease approximately 0.04% while that of the take-up reel will increase a substantially equal amount during the tape transporting operation. Tests have indicated that the Δ bias effect resulting from the use of a capstan of the construction shown in FIG. 3 is of the same order of magnitude, but, as explained above, of opposite sign. As is evident from the formula, by increasing or decreasing the belt thickness, $t_b$, the belt effect velocity changes can be increased or decreased. By measuring or calculating the Δ bias effect and adjusting the belt characteristics to produce an equal but opposite belt effect, reel size variations will no longer produce tension variations in systems relying solely upon differential deformation to generate tape tension. Similarly, by measuring or calculating the "brake effect" in systems generating tension through the use of supply reel braking in addition to the differential deformation the belt thickness can be selected to cause the Δ bias, belt and brake effects to add to zero to eliminate reel size as a factor determining the tension level.

We claim:

1. In a tape transport of the type having supply and take-up reels on shafts rotatably mounted on relatively movable supports and having means biasing said reels, by way of said supports, toward a rotatably mounted driving capstan having a resiliently deformable peripheral portion, with a substantially constant, reel-size independent force in such a way that the bias of said take-up reel towards said capstan is greater in magnitude than the bias of said supply reel toward said capstan, a method of minimizing the effects of reel size upon the level of tape tension, said method comprising:

driving each said reel from said capstan through the medium of a relatively thin layer which circumferentially surrounds, and is attached to, said peripheral portion of the capstan, said layer being of flexible but substantially inelastic material and, at the interface between said reel and said capstan, said layer being deformed, together with said peripheral resilient portion, in conformity with the contour of said reel, and the thickness of said layer being chosen substantially according to the equation $$V_r = V_c(R_r/R_r + t_b/2)$$

wherein:

$V_r$ is the velocity of the reel periphery;
$V_c$ is the constant pitch line velocity of the layer;
$R_r$ is the radius of the reel; and
$t_b$ is the thickness of the layer so that, as the diameter of said reel increases and decreases during the tape transport operation, the surface speed of said reel is increased and decreased, respectively, relatively to the speed of the pitch-line of said layer by an amount of the same order of magnitude as, but of a sign opposite to changes in said surface speed due to variations in the rates of elastic flow of said peripheral portion of the capstan as a function of said reel diameter.

2. In a tape transport of the type having supply and take-up reels on shafts rotatably mounted on relatively movable supports and having means biasing said reels, by way of said supports, toward a rotatably mounted driving capstan having a resiliently deformable peripheral portion, with a substantially constant, reel-size independent force in such a way that the bias of said take-up reel toward said capstan is greater in magnitude than the bias of said supply reel toward said capstan, means for substantially eliminating the effects of reel size upon the level of tape tension, the last-mentioned means comprising a relatively thin belt attached to said peripheral portion of the capstan and being of a flexible, although substantially inelastic, material so as to cause said belt, between said reel and said capstan, to be deformed, together with said peripheral resilient portion, in conformity with the contour of said reel, the thickness of said belt being chosen substantially according to the equation $$V_r = V_c(R_r/R_r + t_b/2)$$

where:

$V_r$ is the velocity of the reel periphery;
$V_c$ is the constant pitch line velocity of the belt;
$R_r$ is the radius of the reel; and
$t_b$ is the thickness of the belt so that, as the diameter of said reel increases and decreases during the tape transport operation, the surface speed of said reel is increased and decreased, respectively, relatively to the speed of the pitch-line of said belt, by an amount of the same order of magnitude as, but of a sign opposite to, changes in said surface speed due to variations in the rates of elastic flow of said peripheral portion of the capstan as a function of said reel diameter.

* * * * *